(12) United States Patent
Fisher

(10) Patent No.: US 6,577,604 B1
(45) Date of Patent: Jun. 10, 2003

(54) DETERMINING LINK CAPACITY UTILIZATION FOR HDLC ENCODED LINKS

(75) Inventor: Kent E. Fisher, Rowlett, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/436,821

(22) Filed: Nov. 9, 1999

(51) Int. Cl.[7] .................................................. H04J 3/06
(52) U.S. Cl. ...................................... 370/252; 370/470
(58) Field of Search ............................... 370/241, 252, 370/253, 464, 470, 498, 563, 509, 512, 513; 375/354, 365, 368

(56) References Cited

U.S. PATENT DOCUMENTS 5,119,367 A * 6/1992 Kawakatsu et al. ......... 370/232
5,199,051 A * 3/1993 Nakabayashi et al. ...... 375/369
6,307,835 B1 * 10/2001 Kasper ....................... 370/229

* cited by examiner

Primary Examiner—Melvin Marcelo
Assistant Examiner—Derrick W. Ferris
(74) Attorney, Agent, or Firm—Haynes and Boone, LLP

(57) ABSTRACT

A system and method for determining link capacity utilization for High Level Data Link Control (HDLC) encoded links is presented. The links transport frames comprised of a known number of bits during a time period and the frames comprise variable length data packets and uniform length sync flags. A circuit, which aids in determining the link capacity utilization, includes a flag detector, a counter, a timeout register, and a shadow register. A sync flag count state is entered if a sync flag is detected by the flag detector. The counter is then incremented if a repeated sync flag is detected within a next data byte. When the time period expires the number of repeated sync flags are forwarded to the shadow register. A processor and the timeout register, which are coupled to the counter, respectively access the number of repeated sync flags and reset the counter. The processor then calculates the link capacity utilization.

18 Claims, 3 Drawing Sheets

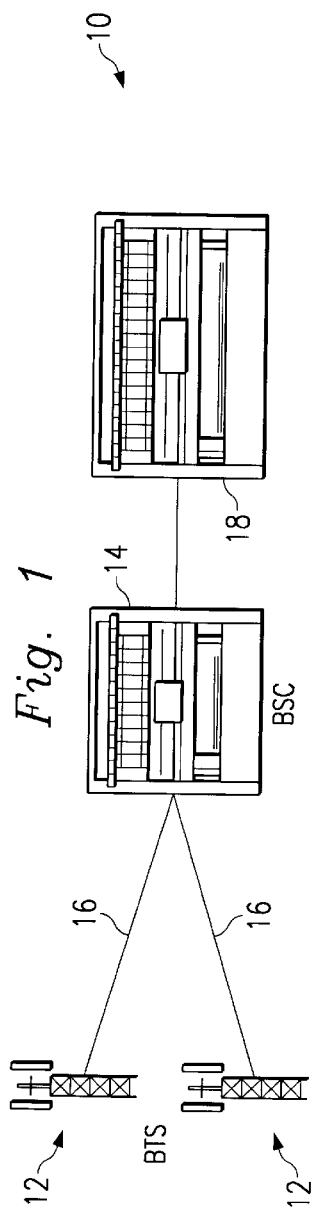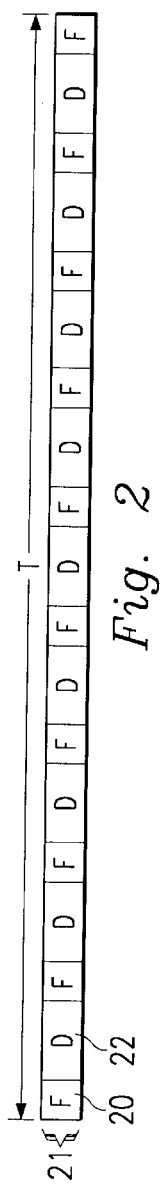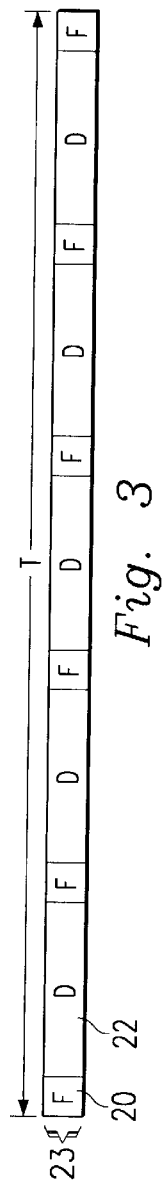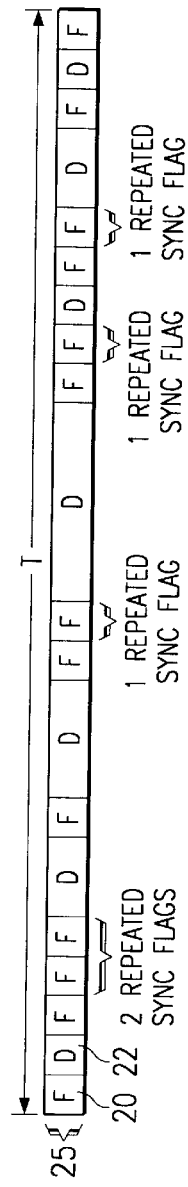

DETERMINING LINK CAPACITY UTILIZATION FOR HDLC ENCODED LINKS

BACKGROUND

This application relates generally to link capacity utilization and, more particularly, to determining link capacity utilization for High Level Data Link Control (HDLC) encoded links.

The HDLC protocol consists of rules for transmitting data between network points or nodes. In HDLC, data is organized into a unit (called a frame) and sent across a network to a destination that verifies its successful arrival. The HDLC protocol also manages the flow (or pacing) at which data is sent. HDLC is one of the most commonly used protocols in Layer 2 of the Open Systems Interconnection communication reference model (Layer 1 is the detailed physical level that involves actually generating and receiving the electronic signals while Layer 3 is the higher level that has knowledge about the network, including access to router tables that indicate where to forward data). Each piece of data is encapsulated in an HDLC frame by adding a trailer and a header (i.e. data link control information). The header contains an HDLC address and an HDLC control field. The trailer is found at the end of the frame, and contains a Cyclic Redundancy Check which detects any errors that may occur during transmission. The frames (or data packets) are separated by HDLC flag sequences (or sync flags) which are transmitted between each frame and whenever there is no data to be transmitted. When data is sent, programming in layer 3 creates a frame that usually contains source and destination network addresses.

Variations of HDLC are also used for the public networks that use the X.25 communications protocol (a network utilizing X.25 is one in which packets of data are moved to their destination along routes determined by network conditions as perceived by routers and reassembled in the right order at the ultimate destination) and for frame relay, a protocol used in public and private local area networks and wide area networks. In the X.25 version of HDLC, the data frame contains a packet and a peer-to-peer communication is used with both ends (receive and transmit) able to initiate communication on duplex links. This mode of HDLC is known as Link Access Procedure Balanced. LAPD, for ISDN D channels and Frame Relay, and LAPM, for error-correcting modems, are other variations of HDLC that may be used.

HDLC encoded links (or backhaul links) are often used in a wireless communication network to provide a connection between a base station controller (BSC) and a base transceiver station (BTS). A mobile phone utilizes the BTS(s) to transmit and receive information.

In order to effectively design and implement the HDLC encoded links in a wireless communication network, the capacity utilization of the HDLC encoded links should be determined. In doing so, the proper number of links and supported bandwidth can be provisioned. If the capacity is not known, an incorrect number of links may be provisioned leading to a situation in which a greater amount or a smaller amount of capacity is available. Both situations lead to increased cost and inefficiencies in the network.

A number of conventional methods exist for determining the capacity utilization of the HDLC encoded links. In general, the frame transmission time, total number of available bits in the frame, and sync flag size (typically 1 byte) are known and at least one sync flag separates the data packets.

In one method, fixed length data packets are used. As such, the link capacity may be determined because the total number of available bits in the frame is divided equally by the fixed length packet size to determine the number of data packets for the frame. For example, if the frame time is 1 second, there may be approximately 1,536,000 available bits in the frame. If each packet size was fixed to hold 100,000 bits, 16 data packets would be needed to transport the available bits. Additionally, since a sync flag precedes and follows each data packet, 17 sync flags (each containing 8 bits), would also be needed. The first 15 data packets would be sent at full capacity but the last data packet would only contain 36,000 bit and would thus only be sent at 36% of capacity. Thus, although the link capacity may be determined by using fixed length data packets, inefficiencies exist in sending data packets that are nearly ⅔ empty over a link where thousands of frames (and thus data packets) may be sent in the span of a few minutes.

In another method, the number of data packets may be counted (utilizing a packet counter) and an average length of each data packet may be assumed. Although the link capacity may be determined, it will not be accurate because the actual data packet may be far bigger and/or far smaller than the chosen average length.

In another method, analytical simulation may be used to determine the link capacity based on various parameters such as speech activity detection, voice coder data rate, and hand-off factors. Although the link capacity may be determined, it will not be accurate because the actual parameters may vary from cell to cell within a network and from network to network.

In another method, the number of bits in data packets and sync flags may be counted (utilizing a frame terminator) and, based on the results, the link capacity may be determined. The limitation with this method, and with the methods previously discussed, is the inability to determine if multiple flags (or repeated flags) between data packets exist. Additional sync flags may be sent if no data was being transmitted at a particular moment in order to maintain the transparency of the link. In such a scenario, the multiple sync flags would not be accounted for resulting in an inaccurate link capacity utilization reading.

In another method, the number of data frames and sync flags may be counted and, based on the results, the number of repeated sync flags may be determined. Although this method may provide a solution for determining the number of repeated sync flags, additional resources (such as a plurality of counters) and added complexity (such as increased computing) are needed to do so.

Therefore, an improved system and method for determining link capacity utilization for HDLC encoded links is desired to reduce or eliminate these limitations and design complexities.

SUMMARY

In response to these and other limitations, provided herein is a unique system and method for determining link capacity utilization for High Level Data Link Control (HDLC) encoded links. The links transport frames comprised of a known number of bits during a time period and the frames comprise variable length data packets and uniform length sync flags. A circuit, which aids in determining the link capacity utilization, includes a flag detector, a counter, a timeout register, and a shadow register.

In one embodiment, a sync flag count state is entered if a sync flag is detected by the flag detector. The counter is then incremented if a repeated sync flag is detected within a next data byte. When the time period expires the number of repeated sync flags are forwarded to the shadow register which is coupled to the counter. A processor and the timeout register, which are coupled to the counter, respectively access the number of repeated sync flags and reset the counter. The processor then calculates the link capacity utilization.

In some embodiments, a number of repeated sync flag bits is subtracted from the number of frame bits in the time period to produce a value and that value is divided by the number of frame bits in the time period to produce the percentage of link utilization.

In some embodiments, the sync flag count state is remained in if a repeated sync flag is detected within the next data byte.

In some embodiments, the sync flag count state is exited and the frames are monitored for sync flags by the flag detector if the repeated sync flag is not detected within the next data byte.

In some embodiments, the timeout register receives a timing pulse (where the timing pulse alerts the counter that the time period has expired), forwards to the shadow register the number of sync flags and sends an interrupt to the processor to access the number of repeated sync flags.

In some embodiments, the circuit resides in a base transceiver station, a base station controller, and/or between the base transceiver station and the base station controller in a communication network.

These advantages, as well as others which will become apparent, are described in greater detail with respect to the drawings and the following disclosure.

BRIEF DESCRIPTION OF THE DRAWINGS

FIG. 1 is a prior art diagrammatic view of a communication system of the present invention.

FIG. 2 is a diagrammatic view of a frame that includes small data packets.

FIG. 3 is a diagrammatic view of a frame that includes large data packets.

FIG. 4 is a diagrammatic view of a frame of the present invention that includes repeated sync flags.

DETAILED DESCRIPTION

Figure 5:
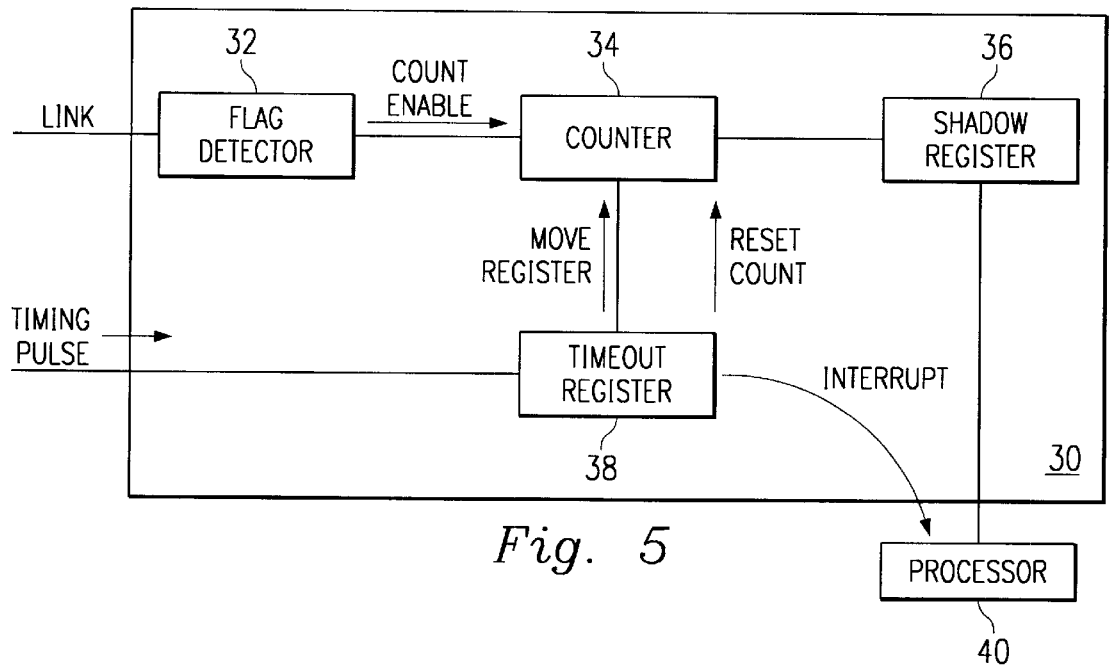
FIG. 5 is a diagrammatic view of a circuit of the present invention.

FIG. 1 depicts a communication system 10 of the present invention. The system includes base transceiver stations (BTSs) 12 that are coupled to a base station controller (BSC) 14 via High Level Data Link Control (HDLC) encoded links 16. These links 16, which may be T1 or E1 links, are also known as backhaul links. The BSC 14 is coupled to a Time Division Multiple Access, Code Division Multiple Access or Global System for Mobile communications capable switch 18 such as, for example, a Mobile Switching Center. A mobile phone (not shown) utilizes the BTSs 12 to transmit and receive information. The system 10 may be connected to other systems (such as an Internet Protocol network) via the switch 18.

FIG. 2 depicts a frame 21 that is transported between a BTS 12 and the BSC 14 via a backhaul link 16 in a frame time (T) of, for example, 1 second. The frame 21 includes small data packets 22 surrounded by sync flags 20.

FIG. 3 depicts a frame 23 that is transported between a BTS 12 and the BSC 14 via a backhaul link 16 in a frame time (T) of, for example, 1 second. The frame 23 includes large data packets 22 surrounded by sync flags 20.

If a sync flag counter were to be utilized in the system 10, a total of 10 sync flags would be counted in frame 21 and a total of 6 sync flags would be counted in frame 23. The link 16 is fully utilized in both cases because each data frame 22 is separated by a single sync flag 20. As such, the number of sync flags in a given frame time can vary while the link is 100% utilized. Therefore, only counting sync flags will not provide an accurate measurement of the link 16 utilization because of the variable nature of the HDLC frames being transported.

FIG. 4 depicts a frame 25 that includes five repeated (or extra) sync flags 20. The extra sync flags are sent in order to maintain the transparency of the link if no data is being sent at a particular moment within the frame time (T). These repeated sync flags should be accounted in order to determine the percentage of link 16 utilization.

FIG. 5 depicts a circuit 30 for determining link capacity utilization for HDLC encoded links in the system 10. The circuit 30 includes a flag detector 32 that monitors the frames on the link 16. The circuit 30 may be located in the BTS 12, the BSC 14, or connected to the link 16 between (and coupled to) the BTS 12 and the BSC 14. If a sync flag is detected by the flag detector 32, a count enable message is sent to a counter 34 which enters a sync flag count state. If a repeated sync flag is detected within a next data byte, the counter 34 is incremented. This action continues until the frame time (T), or time period, expires, and a timing pulse is sent, via the link 16, to a timeout register 38. The timing pulse alerts the counter 34 that the time period has expired. The timeout register 38 then sends a move register message to the counter 34. The number of repeated sync flags are then forwarded to a shadow register 36. The timeout register also sends a reset count message to the counter 34 to reset the number of repeated sync flags count to zero and sends an interrupt to a processor 40. The processor 40 then accesses the number of repeated sync flags from the shadow register 36 and calculates the percentage of link utilization. This circuit would require little hardware logic and CPU bandwidth to calculate the percentage of link utilization.

To calculate the link capacity utilization, the number of repeated sync flag bits is subtracted from the number of frame bits in the time period to produce a value. That value is divided by the number of frame bits in the time period to produce the percentage of link capacity utilization. For example, it is assumed that the frame 25 in FIG. 4 includes 27 bytes (216 bits). Since the frame 25 also includes 5 repeated sync flags they should be accounted for when determining the link utilization. In this scenario, the link utilization for frame time T is given by:

$$[(216-40)/216] \times 100 = 82\%$$

Thus, the link would be 82% utilized during the frame time (T) interval.

Many backhaul links (T1/E1) are over provisioned because the actual link utilization is unknown. Additionally, leased backhaul links account for a considerable portion of the monthly recurring operating costs of a service provider or a network operator. As such, the ability to accurately provision backhaul links may result in a reduction of links required in a given network implementation thereby lowering network operating costs. Further, if backhaul links are under provisioned, users may be unable to access the network and the network operator may not fully realize the available financial potential of running an efficient network.

Figure 6:
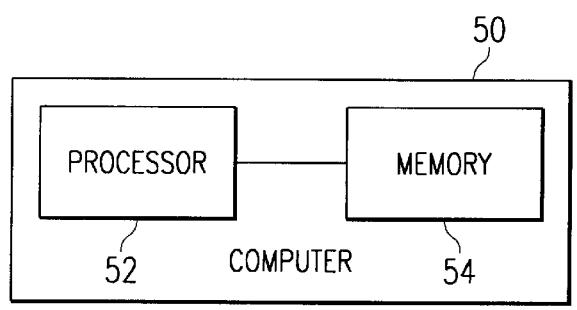
FIG. 6 is a diagrammatic view of a computer of the present invention.

FIG. 6 depicts a computer 50 (which contains a computer program) that comprises a processor 52 and memory 54. The computer 50 may be a personal computer or laptop, the circuit 30, the BTS 12, the BSC 14, and/or any device that can send and receive information via HDLC encoded links. The processor 52 may be a central processing unit, digital signal processor, microprocessor, microcontroller, microcomputer, and/or any device that manipulates digital information based on programming instructions. The memory 54 may be read-only memory, random access memory, flash memory and/or any device that stores digital information. The memory 54 is coupled to the processor 52 and stores programming instructions that, when read by the processor, cause the processor to perform certain processing operations.

Figure 7:
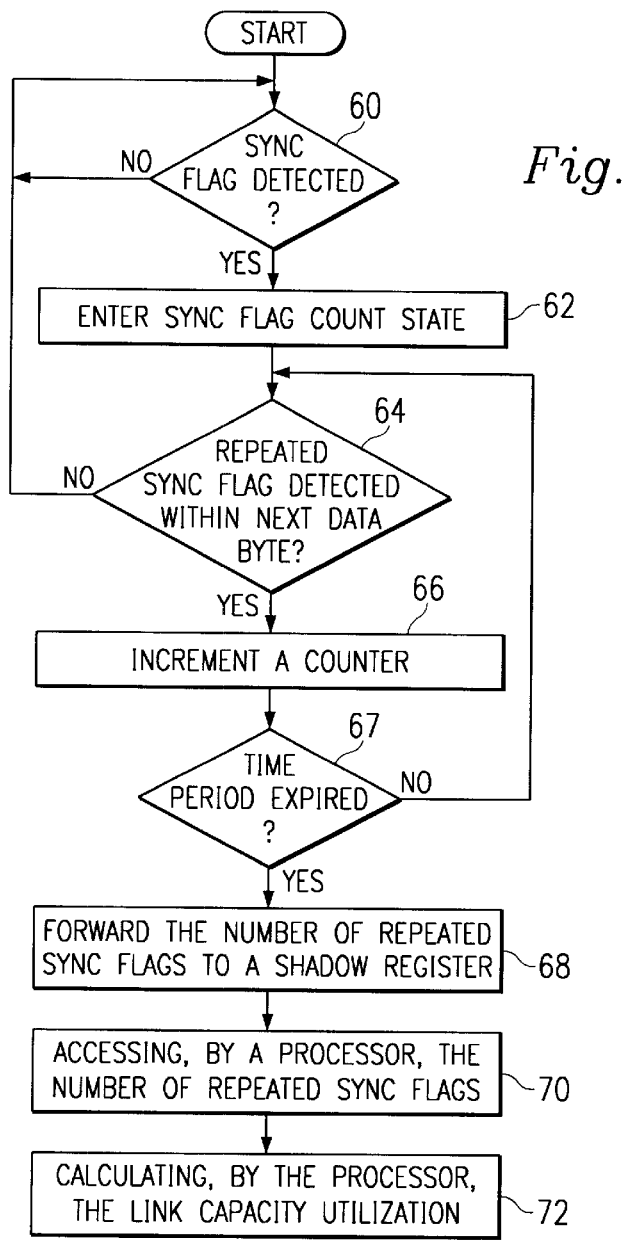
FIG. 7 is a flow chart of a method of the present invention for determining link capacity utilization.

FIG. 7 describes a method for determining link capacity that may be implemented by the computer 50 of FIG. 6. The method begins at decision 60 where a check is performed to determine if a sync flag has been detected. If it has not, the method returns to decision 60 and keeps checking to determine if a sync flag has been detected. If it has, a sync flag count state is entered at step 62. The method proceeds to decision 64 where a check is performed to determine if a repeated sync flag has been detected within a next data byte. If it has not, the method exits the sync flag count state and proceeds back to decision 60 where the backhaul links are monitored for sync flags. If it has, a counter is incremented at step 66. At decision 67, a check is performed to determine if a time period expires. If it does not, the method remains in the sync flag count state. If it does, the number of repeated sync flags is forwarded to a shadow register at step 68. A timing pulse alerts the counter that the time period has expired. It should be noted that the method may proceed to step 68 any time the timing pulse is received by the counter. At step 70 the processor accesses the number of repeated sync flags and at step 72, the processor calculates the link capacity utilization.

Figure 8:
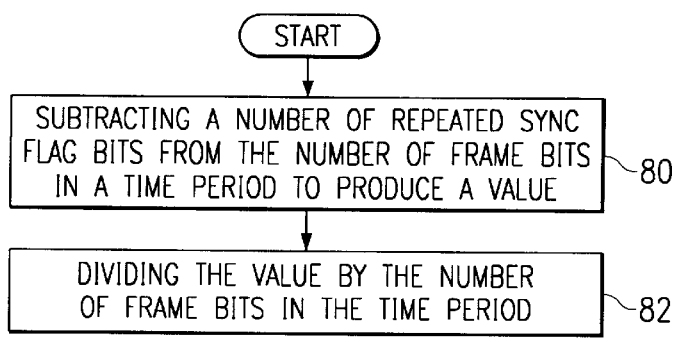
FIG. 8 is a flow chart of a method of the present invention for calculating the percentage of link utilization.

FIG. 8 describes a method for determining the percentage of link utilization that may be implemented by the computer 50 of FIG. 6. The method begins at step 80 where a number of repeated sync flag bits is subtracted from a number of frame bits in a time period to produce a value. At step 82, the value is divided by the number of frame bits in the time period in order to produce the percentage of link utilization.

The present invention thus enjoys several advantages. For example, because repeated sync flags can be accounted for, a more accurate percentage of link utilization may be determined. This is especially important in an environment where the number of wireless devices, and thus the number of frames being transported over backhaul links, are quickly increasing. Also, the circuit that measures the link utilization requires a small amount of hardware, software, and processing power. As such, it may be utilized in a variety of systems that have a limited availability of hardware logic and processing bandwidth. Further, through the use of the present invention, accurately provisioning backhaul links is possible. This results in a reduction of links required in a given network implementation thereby lowering network operating costs.

It is understood that variations may be made in the foregoing without departing from the scope of the present invention. For example, any number and combination of entities such as BTS's 12, BSC's 14, backhaul links 16, switches 18, circuits 30, flag detectors 32, counters 34, shadow registers 36, timeout registers 38, processors 40 and 52, computers 50, and memories 54 may be used with the present system. Further, the system 10 may be connected to another wireless, wireline, data, and/or multi-media system. Also, the processors 40, 52 and/or memory 54 may be included in the circuit 30. Additionally, the number of repeated sync flags may be forwarded directly to the processor 40 or may be accessed directly from the counter 34 by the processor 40. Still further, the number of sync flags, as well as the number of repeated sync flags, may be forwarded to the shadow register 36.

It is further understood that other modifications, changes and substitutions are intended in the foregoing disclosure and in some instances some features of the disclosure will be employed without corresponding use of other features. Additionally, singular discussion of items such as HDLC encoded links, BSC's and BTS's is also meant to apply to situations where multiple HDLC encoded links, BSC's and/or BTS's exist. Accordingly, it is appropriate that the appended claims be construed broadly and in a manner consistent with the scope of the disclosure.

What is claimed is:

1. A method for determining, by a circuit, link capacity utilization for High Level Data Link Control encoded links, wherein the links transport frames comprised of a known number of bits during a time period, wherein the frames comprise variable length data packets and uniform length sync flags, and wherein the circuit comprises a flag detector, a counter, a timeout register, and a shadow register, the method comprising the steps of:

entering a sync flag count state if a sync flag is detected by the flag detector;

incrementing the counter if a repeated sync flag is detected within a next data byte, wherein the counter is coupled to the flag detector;

when the time period expires, forwarding, to the shadow register, a number of the repeated sync flags, wherein the shadow register is coupled to the counter;

accessing, by a processor, the number of repeated sync flags, wherein the processor is coupled to the shadow register; and calculating, by the processor, the link capacity utilization.

2. The method of claim 1, wherein the step of calculating the link capacity utilization further comprises the steps of:

subtracting a number of repeated sync flag bits from the number of frame bits in the time period to produce a value; and dividing the value by the number of frame bits in the time period in order to produce a percentage of link utilization.

3. The method of claim 1 further comprising the step of remaining in the sync flag count state if a repeated sync flag is detected within a next data byte.

4. The method of claim 1 further comprising the steps of, if the repeated sync flag is not detected within the next data byte:

exiting the sync flag count state; and monitoring, by the flag detector, the data for sync flags.

5. The method of claim 1 further comprising the steps of:

receiving, by the timeout register, a timing pulse, wherein the timing pulse alerts the counter that the time period has expired and wherein the timeout register is coupled to the counter;

resetting, by the timeout register, the counter; and sending, by the timeout register, an interrupt to the processor to access the number of repeated sync flags.

6. The method of claim 1, wherein the circuit resides in at least one of the following locations from the group consisting of:

a base transceiver station in a communication network;

a base station controller in the communication network; and between the base transceiver station and the base station controller in the communication network, wherein the circuit is coupled to the base transceiver station and the base station controller.

7. A circuit for determining link capacity utilization for High Level Data Link Control encoded links, wherein the links transport frames comprised of a known number of bits during a time period, wherein the frames comprise variable length data packets and uniform length sync flags, and wherein the circuit comprises a flag detector, a counter, a timeout register, and a shadow register, the circuit comprises:

means for entering a sync flag count state if a sync flag is detected by the flag detector;

means for incrementing the counter it a repeated sync flag is detected within a next data byte, wherein the counter is coupled to the flag detector;

when the time period expires, means for forwarding, to the shadow register, a number of the repeated sync flags, wherein the shadow register is coupled to the counter;

means for accessing, by a processor, the number of repeated sync flags, wherein the processor is coupled to the shadow register; and means for calculating, by the processor, the link capacity utilization.

8. The circuit of claim 7, wherein calculating the link capacity utilization further comprises:

means for subtracting a number of repeated sync flag bits from the number of frame bits in the time period to produce a value; and means for dividing the value by the number of frame bits in the time period in order to produce a percentage of link utilization.

9. The circuit of claim 7 further comprises means for remaining in the sync flag count state if a repeated sync flag is detected within a next data byte.

10. The circuit of claim 7 further comprises, if the repeated sync flag is not detected within the next data byte,:

means for exiting the sync flag count state; and means for monitoring, by the flag detector, the data for sync flags.

11. The circuit of claim 7 further comprises:

means for receiving, by the timeout register, a timing pulse, wherein the timing pulse alerts the counter that the time period has expired and wherein the timeout register is coupled to the counter;

means for resetting, by the timeout register, the counter; and means for sending, by the timeout register, an interrupt to the processor to access the number of repeated sync flags.

12. The circuit of claim 7, wherein the circuit resides in at least one of the following locations from the group consisting of:

a base transceiver station in a communication network;

a base station controller in the communication network; and between the base transceiver station and the base station controller in the communication network, wherein the circuit is coupled to the base transceiver station and the base station controller.

13. A system for determining link capacity utilization for High Level Data Link Control (HDLC) encoded links, the system comprises:

a communications switch;

a base station controller coupled to the switch;

the HDLC encoded link coupled to a base transceiver station and the base station controller; and a circuit that allows a percentage of link utilization to be calculated by determining a number of repeated sync flags, wherein the circuit resides in at least one of the following locations from the group consisting of:

the base transceiver station;

the base station controller; and between the base transceiver station and the base station controller, wherein the circuit is coupled to the base transceiver station and the base station controller.

14. A computer program for use in a circuit that monitors High Level Data Link Control encoded links, the program comprising instructions for:

entering a sync flag count state if a sync flag is detected by a flag detector;

incrementing a counter if a repeated sync flag is detected within a next data byte, wherein the counter is coupled to the flag detector;

when a time period expires, forwarding, to a shadow register, a number of the repeated sync flags, wherein the shadow register is coupled to the counter;

accessing, by a processor, the number of repeated sync flags, wherein the processor is coupled to the shadow register; and calculating, by the processor, the link capacity utilization.

15. The computer program of claim 14 further comprising instructions for:

subtracting a number of repeated sync flag bits from the number of frame bits in the time period to produce a value; and dividing the value by the number of frame bits in the time period in order to produce a percentage of link utilization.

16. The computer program of claim 14 further comprising instructions for remaining in the sync flag count state if a repeated sync flag is detected within a next data byte.

17. The computer program of claim 14 further comprising instructions for, if the repeated sync flag is not detected within the next data byte,:

exiting the sync flag count state; and monitoring, by the flag detector, the data for sync flags.

18. The computer program of claim 14 further comprising instructions for:

receiving, by the timeout register, a timing pulse, wherein the timing pulse alerts the counter that the time period has expired and wherein the timeout register is coupled to the counter;

resetting, by the timeout register, the counter; and sending, by the timeout register, an interrupt to the processor to access the number of repeated sync flags.

* * * * *